United States Patent Office 3,108,118
Patented Oct. 22, 1963

3,108,118
ACETALS OF 5-NITRO-2-FURALDEHYDE
Ernst Jucker, Binningen, Basel-Land, and Adolf J. Lindenmann, Basel, Switzerland, assignors to Sandoz Ltd. (also known as Sandoz A.G.), Basel, Switzerland, a Swiss firm
No Drawing. Filed Aug. 30, 1960, Ser. No. 52,769
Claims priority, application Switzerland Sept. 2, 1959
7 Claims. (Cl. 260—338)

The present invention relates to novel nitrofurane derivatives and method of preparation, the nitrofurane compounds having the general formula

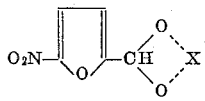

in which X is a straight chain or branched chain alkylene radical having from 2 to 6 carbon atoms in the alkylene chain, said alkylene chain being substituted with hydrogen, lower alkyl, monocarbocyclic aryl such as phenyl, or dicarbocyclic aryl such as napthyl, whereby X completes a heterocyclic ring attached to the 2 position of the 5-nitrofurane which contains two hetero oxygen atoms and from 5 to 9 members in the heterocyclic ring.

GENERAL METHOD FOR PREPARATION

A method for preparing the nitrofurane compounds comprises condensing 5-nitro-2-furaldehyde with a dihydric alcohol having the general formula

in which X has the significance indicated in the preceding paragraph.

The reactive dihydric alcohol is condensed with 5-nitro-2-furaldehyde at elevated temperature preferably in an inert organic aromatic hydrocarbon solvent such as benzene, toluene, xylene and in the presence of a condensation catalyst such as p-toluene sulfonic acid, benzene sulfonic acid, to permit evaporation, condensation and separation of water of reaction whereby the novel nitrofurane derivative substituted with a 5–9 membered heterocyclic ring in the 2 position of 5-nitrofurane and containing two oxygen hetero atoms in the cyclic ring is recovered by using known methods. The purification may also be effected by known methods e. g. by distillation and/or recrystallization.

Examples of reactive dihydric alcohols which may be employed in the condensation reaction with 5-nitro-2-furaldehyde include ethylene glycol, 1,2-propane diol, 1,3-butane diol, 1,4-butane diol, 1,6-hexane diol, hydrobenzoin, 1,5-pentane diol, 1-phenyl-1,3-propane diol, 2,2-diethyl-1,3-propane diol, 1-naphthyl-2,2-diethyl-propane diol, 2-ethyl-2-n-butyl-1,3-propane diol, etc.

In a typical illustrative preparative method, molar reacting amounts of 5-nitro-furaldehyde and ethylene glycol are dissolved in benzene and the mixture heated to reflux temperature in a flask fitted with reflux condenser and water separating tube whereby most of the water of reaction separates during the first 2–4 hours of reaction. To complete the reaction heating is continued at reflux for an additional 4–12 hours and after evaporating the benzene solvent, the residue is worked up and purified by known methods such as by crystallization, chromatographic adsorption or distillation of the product under vacuum.

UTILITY

The heterocyclic di-oxygen containing substituted nitrofuranes of the invention possess valuable therapeutic properties which make them particularly desirable and effective in the treatment of heart disease, especially angina pectoris and coronary heart disease. Administration of these compounds in appropriate therapeutic dosage effects a dilatation of the peripheral blood vessels and capillaries and simultaneously lowers the blood pressure without exhibiting any essential influence on the frequency of the heart beat. Electrocardiogram examination after the compounds of the invention are administered in suitable dosage demonstrates that there is no influence on the excitation discharge in the heart and that the compounds of the invention are free from untoward cardiac reactions. The toxicity of the compounds of the invention is very low especially in comparison with the drugs of choice such as nitroglycerin used in the care and management of anigina pectoris. Surprisingly, the duration of lowered blood pressure in the peripheral blood vessels is surprisingly long, lasting for several hours after single dosage, thus making the compounds of the invention especially effective in care and management of patients suffering from angina pectoris complicated by high blood pressure.

It is surprising that this unusual rapid acting and long lasting pharmacological characteristic be exhibited by the heterocyclic substituted nitrofuranes of the invention since certain of the drugs hitherto employed for similar effect such as nitroglycerin and nitromannitol represent efforts to increase available "nitrite" in the body through increasing the number of nitro groups in the molecule.

Erythrityl tetranitrate and mannitol hexanitrate are slowly absorbed from the intestinal tract. In large measure this fact accounts for the delayed onset and protracted duration of their action.

The invention provides the same advantage of slow absorption but in contrast to the high nitro content provides a much lower content than in the last named drugs.

Also mild to severe cardio-vascular reactions to nitroglycerin occur with patients having essential hypertension and hypertensive heart disease and these reactions are largely avoided with the compounds of the invention.

The compounds of the invention under Formula I may be administered by mouth, intravenously, intramuscularly or subcutaneously.

The preparation of the novel compounds and features of the novel method are illustrated in the following specific examples, these given by way of illustration and not for limitation, all of the temperature values in the examples are in degrees centigrade. The melting points are determined in evacuated capillary tubes—the values of melting points are uncorrected.

Example 1

2-(5'-NITROFURYL-2')-1,3-DIOXOLANE

A mixture was prepared from 28.2 grams 5-nitro-2-furaldehyde, 13.6 grams ethylene glycol and a few crystals of p-toluene sulfonic acid as condensation catalysts in 150 cubic centimeters of benzene. This mixture was heated in a glass reactor fitted with a water separator tube and reflux cooling condenser for a period of 16 hours at the boiling point of the mixture. Most of the quantity of the water formed by the condensation reaction separated in the water separator tube during the first 2 hours of the refluxing reaction. The benzene solution was then decanted from the resinous residue in the reaction flask and the benzene evaporated under vacuum. The crude reaction product was then triturated with petroleum ether and recrystallized twice from ethanol or ether-petroleum ether. The 2-(5'-nitrofuryl-2')-1,3-dioxolane in purified form melted at 44–45° C.

Example 2

2-(5'-NITROFURYL-2')-4(5)-METHYL-1,3-DIOXOLANE

In accordance with the procedure set out in Example 1, a mixture of 28.2 grams 5-nitro-2-furaldehyde, 16.7 grams 1,2-propane diol and a few crystals of p-toluene sulfonic acid in 150 cubic centimeters of benzene was heated at reflux temperature for a period of 16 hours. After the benzene solution was decanted from the resinous residue in the reactor, the benzene was evaporated under vacuum and the residue distilled under vacuum, whereby the 2-(5'-nitrofuryl-2')-4(5)-methyl-1,3-dioxolane was recovered in the form of a yellowish oil, having a boiling point of 141° C. at 1.1 millimeter of mercury.

Example 3

2-(5'-NITROFURYL-2')-4(6)-METHYL-1,3-DIOXANE

Following the procedure outlined in Example 1, a mixture of 28.2 grams 5-nitro-2-furaldehyde, 19.8 grams 1,3-butane diol and a few crystals of p-toluene sulfonic acid in 150 cubic centimeters of benzene was heated for a period of 15 hours. After the benzene solution was decanted from the resinous residue and the benzene eliminated under vacuum, the crystalline yellow residue was recrystallized from ethyl acetate-petroleum ether—melting point 106–107° C.

Example 4

2-(5'-NITROFURYL-2')-1,3-DIOXEPANE

As in the procedure described in Example 1, a mixture of 28.2 grams 5-nitro-2-furaldehyde, 19.8 grams of 1,4-butane diol and a few crystals of p-toluene sulfonic acid in 150 cubic centimeters of benzene was heated for a period of 2 hours. After the benzene solution was decanted from the resinous residue and the benzene eliminated under vacuum, the crystalline residue was triturated with a mixture of methanol and ether and the crystals were filtered. After being recrystallized twice from benzene-petroleum ether, a melting point of 87–89° C. was observed.

Example 5

2-(5'-NITROFURYL-2')-1,3-DIOXONANE

In accordance with the procedure set out in Example 1, a mixture of 28.2 grams 5-nitro-2-furaldehyde, 25.9 grams 1,6-hexane diol and a few crystals of p-toluene sulfonic acid in 150 cubic centimeters of benzene was heated for a period of 16 hours. After separation by decantation of the resinous residue, benzene was removed in a vacuum and the residue was boiled with 200 cubic centimeters of acetone. After cooling, the separated mass of crystals was filtered off and recrystallized from pyridine—melting point 189–191° C.

Example 6

2-(5'-NITROFURYL-2')-4,5-DIPHENYL-1,3-DIOXOLANE

In accordance with the procedure set out in Example 1, a mixture of 14.1 grams 5-nitro-2-furaldehyde, 23.4 grams hydrobenzoin (mixture of the meso- and racemic form) and a few crystals of p-toluene sulfonic acid in 100 cubic centimeters of benzene was heated for a period of five hours. After separation of the resinous residue by decantation and removal of the benzene in a vacuum, the crystalline residue was recrystallized twice from benzene. The 2-(5'-nitrofuryl-2')-4,5-diphenyl-1,3-dioxolane melted at 168° C.

From the mother liquor in benzene it was possible to obtain the stereoisomer of the required product with a melting point of 133–135° C. by reducing the mother liquor in volume and adding a little petroleum ether.

Example 7

2-(5'-NITROFURYL-2')-4(6)-PHENYL-5,5-DIETHYL-1,3-DIOXANE

In accordance with the procedure described in Example 1, a mixture of 14.1 grams 5-nitro-2-furaldehyde, 22.8 grams 1-phenyl-2,2-diethyl-1,3-propane diol and a few crystals of p-toluene sulfonic acid in 150 cubic centimeters of benzene was heated for a period of 6 hours. Most of the quantity of the water formed separated during the first 2 hours. The benzene solution was then decanted from the resinous residue and the benzene was evaporated under vacuum. The dark brown, oily residue was chromatographed on aluminum oxide; the 2-(5'-nitrofuryl-2')-4(6)-phenyl-5,5-diethyl-1,3-dioxane was eluted with benzene. After recrystallization from benzene-petroleum ether the required product had a melting point of 85–86° C.

Reference is now made to the table given below wherein 5 further examples are given for the production of compounds having the general Formula I above; in each case 5-nitro-2-furaldehyde was used as starting material in addition to the dihydric alcohol shown in the 2nd column of the table.

| Compound | Dihydric Alcohol Reactant | Properties | Method of Preparation According to Example— |
|---|---|---|---|
| 2-(5'-Nitrofuryl-2')-4(5)-phenyl-1,3-dioxolane. | phenylethylene glycol (by reduction of mandelic acid with LiAlH₄. | boiling point 180°/0.2 mm. Hg, viscous red-brown oil. | 2 |
| 2-(5'-Nitrofuryl-2')-4,5-dimethyl-1,3-dioxolane. | 2,3-butane diol. | boiling point 135°/1.2 mm. Hg, light yellow oil. | 2 |
| 2-(5'-Nitrofuryl-2')-4(6)-phenyl-1,3-dioxane. | 1-phenyl-1,3-propane diol. | melting point 103° C.—crystallized from benzene-petroleum ether. | 3 |
| 2-(5'-Nitrofuryl-2')-5,5-diethyl-1,3-dioxane. | 2,2-diethyl-1,3-propane diol. | melting point 97–98° C.—crystallized from benzene-petroleum ether. | 3 |
| 2-(5'-Nitrofuryl-2')-5-ethyl-5-n-butyl-1,3-dioxane. | 2-ethyl-2-n-butyl-1,3-propane diol. | melting point 98–99° C.—crystallized from benzene-petroleum ether. | 3 |

As can be seen from the foregoing examples and from the preceding table, the alkylene radical of the dihydric alcohol may be substituted with hydrogen, e.g., ethylene glycol or 1,6-hexane diol or with lower alkyl such as methyl (1,3-propane diol), ethyl (1,2-butane diol), propyl or butyl or may be substituted with phenyl (hydrobenzoin or 1-phenyl-2,2-diethyl-1,3-propane diol), or with naphthyl, e.g., 1-naphthyl-2,2-diethyl-1,3-propane diol, etc.

By condensing the dihydric alcohol and 5-nitro-2-furaldehyde in an inert aromatic hydrocarbon, nitrated or chlorinated aromatic hydrocarbon solvent at a temperature sufficient to eliminate water of condensation as it is formed by the reaction and by having present an aromatic sulfonic acid as catalyst, e.g., benzene sulfonic acid, naphthalene sulfonic acid, toluene sulfonic acid, etc., there is isolated after the reaction has been completed the desired 2-heterocyclic substituted 5-nitrofurane which can be purified by conventional procedures such as by crystallization, chromatographic adsorption or vacuum distillation.

The invention is further defined in the claims which follow.

We claim:
1. 2-(5'-nitrofuryl-2')-1,3-dioxolane.
2. 2-(5'-nitrofuryl-2')-1,3-dioxepane.
3. 2-(5'-nitrofuryl-2')-1,3-dioxonane.
4. 2-(5'-nitrofuryl-2')-4-phenyl-1,3-dioxolane.
5. 2-(5'-nitrofuryl-2')-4,5-dimethyl-1,3-dioxolane.
6. 2-(5'-nitrofuryl-2')-4-phenyl-1,3-dioxane.

7. A compound of the formula

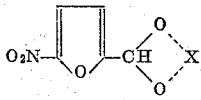

wherein X is a member selected from the group consisting of an alkylene of 2 to 9 carbon atoms and mono- and di-phenyl alkylene and wherein the alkylene moiety of the alkylene is of 2 to 7 carbon atoms.

References Cited in the file of this patent

UNITED STATES PATENTS

| | | |
|---|---|---|
| 1,934,309 | Hoover | Nov. 7, 1933 |
| 2,153,134 | Dickey et al. | Apr. 4, 1939 |
| 2,799,686 | Carrara | July 16, 1957 |
| 2,922,776 | Wulff et al. | Jan. 26, 1960 |

OTHER REFERENCES

Hinz et al.: Ber., volume 76, pages 687–688 (1943).